United States Patent [19]

Emalfarb et al.

[11] Patent Number: 4,984,689
[45] Date of Patent: Jan. 15, 1991

[54] PACKAGING SYSTEM FOR LANDSCAPING BED DIVIDERS

[76] Inventors: Seymour Emalfarb; Bradley S. Emalfarb, both of 1585 Saunders, Riverwoods, Ill. 60015

[21] Appl. No.: 433,221

[22] Filed: Nov. 8, 1989

[51] Int. Cl.$^5$ .............................................. B65D 21/00
[52] U.S. Cl. .................................. 206/499; 206/83.5; 206/451; 47/33; 53/399; 53/446
[58] Field of Search ....................... 206/83.5, 321, 322, 206/323, 442, 443, 448, 451, 499; 47/33; 53/399, 446, 447, 544

[56] References Cited

U.S. PATENT DOCUMENTS

| | | | |
|---|---|---|---|
| 2,833,403 | 5/1968 | Benschoter | 206/83.5 |
| 3,003,625 | 10/1961 | Anderson | 206/499 |
| 3,146,112 | 8/1964 | Weinstein | 206/499 |
| 3,195,723 | 7/1965 | MacDonnel et al. | 206/321 |
| 3,415,367 | 12/1968 | Lynch | 206/321 |
| 3,915,298 | 10/1975 | Adams et al. | 206/321 |
| 4,281,473 | 8/1981 | Emalfarb et al. | 47/33 |
| 4,446,964 | 5/1984 | Morgan | 206/321 |
| 4,621,731 | 11/1986 | Tschudin-Mahrer | 206/451 |

Primary Examiner—David T. Fidei
Attorney, Agent, or Firm—Wood, Phillips, Mason, Recktenwald & Vansanten

[57] ABSTRACT

A system and method for packaging a plurality of sections of bed dividers which form a boundary between adjacent landscaping areas. Each section includes an elongated divider structure having an enlarged upper portion and a flange portion extending lengthwise along the upper portion and depending downwardly therefrom for insertion in the ground. A plurality of the bed divider sections are arranged in an elongated stack of juxtaposed sections. Another of the bed divider sections is arranged lengthwise along at least one side of the stack in such a manner that its flange portion is generally perpendicular to the flange portions of the plurality of bed divider sections in the stack. All of the bed divider sections are held in this arrangement whereby the stack of bed divider sections rigidify the package in one transverse direction, and the side bed divider section rigidifies the package in the opposite transverse direction.

9 Claims, 1 Drawing Sheet

U.S. Patent
Jan. 15, 1991
4,984,689
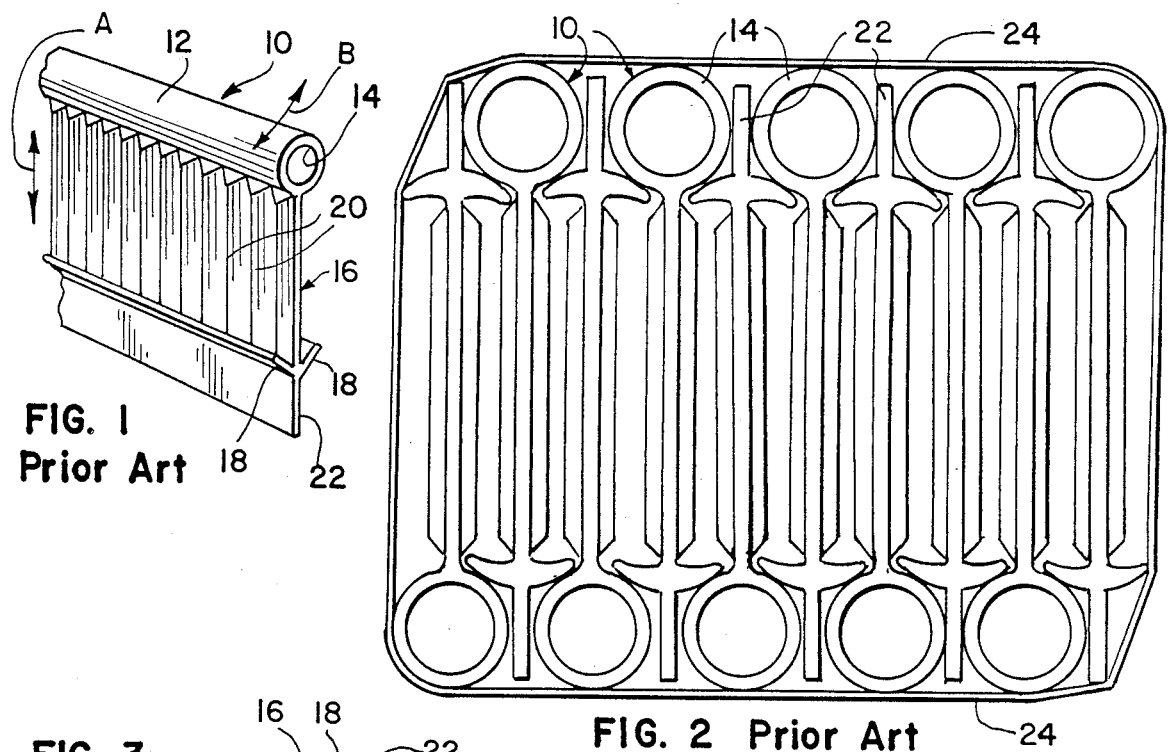
FIG. 1 Prior Art
FIG. 2 Prior Art
FIG. 3 Prior Art
FIG. 4
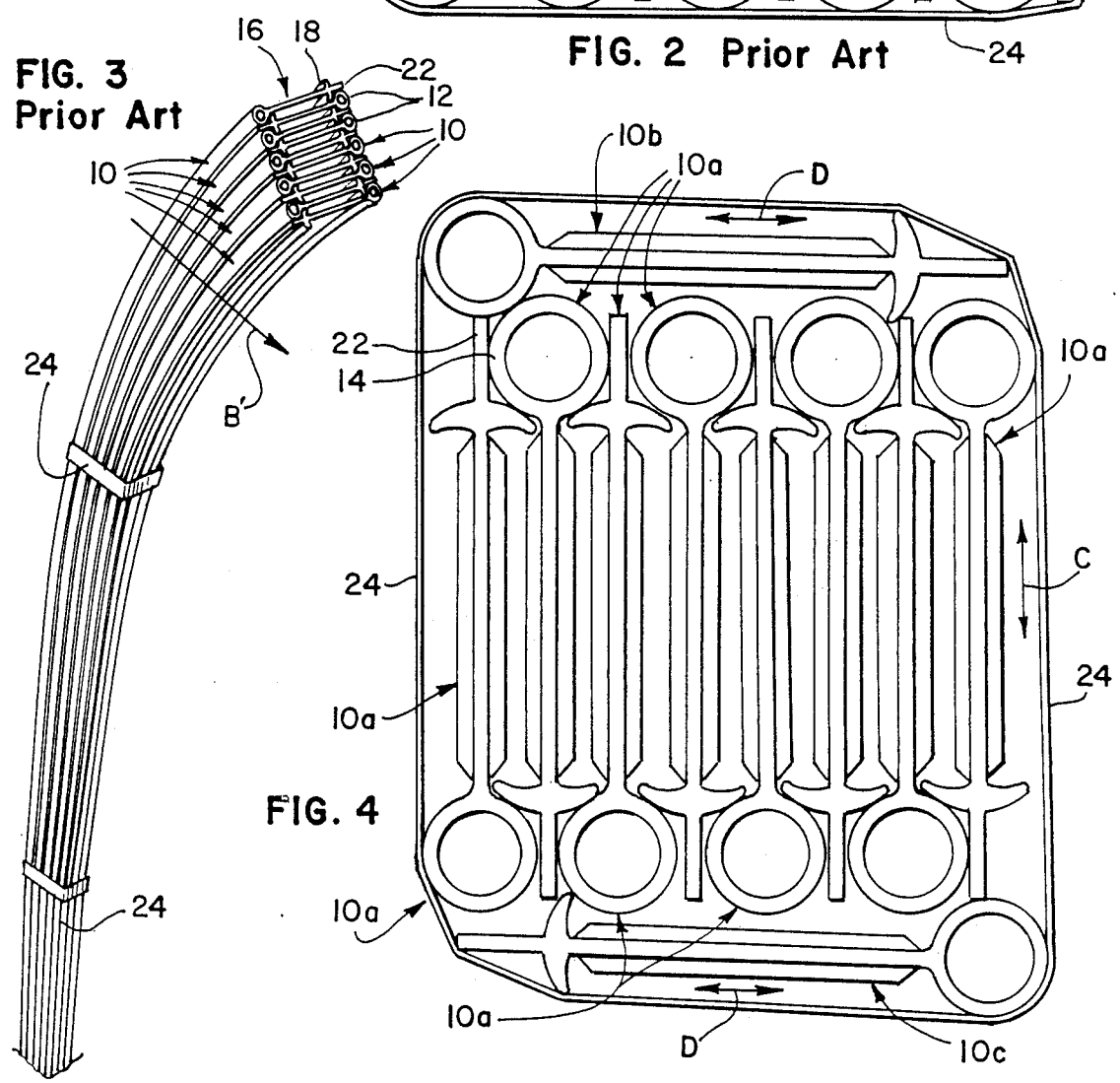

PACKAGING SYSTEM FOR LANDSCAPING BED DIVIDERS

FIELD OF THE INVENTION

This invention generally relates to landscaping bed dividers, water irrigation delivery systems or the like, and, particularly, to a system and method of packaging a plurality of sections of bed dividers for shipping, handling and storage or display purposes.

BACKGROUND OF THE INVENTION

It long has been the practice to separate various areas of a lawn, garden or other landscaping areas by means of gravel, rocks, bricks or other suitable means arranged to form a boundary between the particular landscaping area and adjacent areas. The lawn often is separated by a flower bed or garden by a brick coping or curb, or the space adjacent the base of a tree often is separated from the lawn in the same general manner. As frequently happens, plant life such as grass or the like roots through or between the coping and into the area which is desired to be separated from the lawn. Consequently, a bed divider is provided to prevent such grass rooting and spreading.

Bed divider structures presently available usually include an enlarged upper portion such as of a tubular configuration and a flange portion extending lengthwise along the upper portion and depending downwardly therefrom for insertion in the ground, whereby the upper portion is located above the top surface of the ground and the flange portion forms a barrier between adjacent landscaping areas. Often, means such as outwardly projecting lips are provided on the flange portion to facilitate securing the flange portion in the ground. An example of such a landscaping bed divider structure is shown in U.S. Pat. No. 4,281,473, dated Aug. 4, 1981, and of which I am a co-inventor. The landscaping bed divider structure of that patent also includes a unique means, in the form of corrugations, provided on the flange portion for reinforcing the same in a vertical direction to facilitate inserting and maintaining the bed divider in the ground. Water irrigation delivery systems include similar structures with the upper tubular portions having apertures or soaker holes for irrigating the adjacent ground.

Bed divider structures of the character described above are provided in elongated sections, such as in ten-foot or twenty-foot lengths. The sections usually are extruded of plastic material. With the above general description of such structures, it can be understood that the bed divider sections are generally rigid in their structural "planes" but are fairly flexible transverse to their planes so that the divider sections can be bent around landscaping area contours, such as a circular area about the base of a tree. The term "plane" of the divider section or structure is used in a general sense, since, as described above, the structure is not actually flat, but it certainly does have a plane for reference purposes in comparison to its extended length and its overall composite dimensional thickness transverse to the flange portion of the structure. In other words, the "plane" of the structure is generally defined by the flange portion of the structure which is embedded in the ground.

There are continuing problems in packaging, handling, storing and displaying such elongated but flexible structures as defined above. The most common form of packaging is to wind each divider section or length into a spiral or coil configuration and contain the section within a cardboard box-like container. This creates a number of problems, including the varied cost of the container itself in comparison to the relatively inexpensive cost of the divider structure. In addition, the dimensions of the spiralled divider sections and their resulting boxed size are not amenable to storage or display in a hardware or garden supply store on conventional shelving. This is particularly true when popular twenty-foot sections are packaged. The resulting boxed product projects considerably outwardly from a conventional display shelf; they often cannot be displayed in "library book" fashion because of limitations on the vertical distances between display shelves; and simply stacking the boxes on shelves results in an exorbitant amount of shelf space required which is not justified for the return on sales of the product.

Consequently, the landscaping bed dividers often are displayed in stores by stacking the boxed product somewhere on the floor which many times is not justified, interferes with traffic patterns and, in some instances, the product ends up being displayed in some area remote from other landscaping or garden supplies which is quite undesirable.

In view of the above problems, demands are being made to package landscaping bed divider sections in their original elongated configurations (i.e., uncoiled). It immediately can be seen that such packaging results in a ten-foot or twenty-foot or other, rather long saleable product. In other words, a plurality of bed divider structures simply are arranged in an elongated stack of juxtaposed sections and held together by retaining means, such as strapping. This method of packaging solves some of the above problems, but magnifies other of the problems and creates still further problems.

More particularly, arranging the divider sections in elongated packages allows the sections to be displayed on standard shelves, such as is done with ordinary copper or galvanized pipes, without projecting outwardly into the aisle. However, it immediately can be seen that ten or twenty linear feet of shelving is required for such a bulky product which does not have the monetary justification as with more expensive compact pipes or other elongated products. This elongated packaging arrangement is amenable to display in "bins", such as is done with lumber in larger material supply stores, but the problem is that such bins usually are located remote from other garden or landscaping products.

It has been attempted to display elongated packages of landscaping bed divider sections "on end" as is done with such elongated products as metal pipes, lightweight wood molding strips and the like. However, it can be noted that such products have their own rigidity and can stand fairly erect. To the contrary, because of the flexible nature of the extruded bed divider sections, long lengths of the divider structures are "limp" in a direction transverse to their flange portions as described above. Consequently, packages of stacked sections are prone to bend and fall over with even the slightest movement away from a vertically supported orientation. This problem could be solved by packaging the entire stack of elongated sections in a cardboard box-like package, but the cost of the packaging material simply would be prohibitive.

Still a further problem with packaging the divider sections in elongated stacked arrays is that, because of their limp nature, such packages are extremely difficult to handle and, in the case of popular twenty-foot lengths, two people are needed to carry the sections without dragging and marring the structures, even though they are light in weight.

It can be seen that a total myriad of problems have been encountered in the total marketing concept of landscaping bed dividers and, today, an actual dilemma exists. This invention is directed to solving these problems by an extremely simple, cost effective packaging system wherein the very nature of the bed divider structure is used to its advantages.

SUMMARY OF THE INVENTION

An object, therefore, of the invention is to provide a new and improved system and method of packaging landscaping bed divider sections of the character described.

In the exemplary embodiment of the invention, the system is directed to the types of bed dividers generally described above which form a boundary between adjacent landscaping areas. Each bed divider section includes an elongated divider structure having an enlarged upper portion and a flange portion extending lengthwise along the upper portion and depending downwardly therefrom for insertion in the ground.

The invention contemplates arranging a plurality of bed divider sections in an elongated stack of juxtaposed sections. Another bed divider section then is arranged lengthwise along at least one side of the stack in such a manner that its flange portion is generally perpendicular to the flange portions of the plurality of bed divider sections in the stack. Preferably, a further of the bed divider sections is arranged along the opposite side of the stack, again in such a manner that its flange portion is generally perpendicular to the flange portions of the plurality of sections in the stack. Means are provided for holding all the bed divider sections in such an arrangement.

With the system described above, it can be understood that the plurality of stacked sections are rigidified in a direction generally parallel to the "planes" of the stacked sections. By placing other sections along the sides of the stack and holding all the sections together, the composite package also becomes rigidified in a direction transverse to the planes of the stacked sections. Consequently, the entire package cannot bend in any direction. Therefore, the package can be easily handled and can be displayed in a vertical orientation without the package bending and falling over.

Preferably, the number of the plurality of bed divider sections in the stack thereof are arranged in an alternating fashion with the enlarged portion of any section being juxtaposed with the distal end of a flange portion of an adjacent section. This facilitates the entire array being generally symmetrical.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented perspective view of a landscaping bed divider structure of a form found in the prior art;

FIG. 2 is an end elevational view of a plurality of bed divider sections packaged in an elongated, stacked array as has been done heretofore;

FIG. 3 is a fragmented perspective view of a package of the bed dividers naturally bending in a direction transverse to their general planes; and FIG. 4 is an end elevational view of an array of bed divider sections arranged in a package according to the system of the invention.

DETAILED DESCRIPTION OF THE INVENTION

Referring to the drawings in greater detail, landscaping bed divider sections generally include elongated divider structures, such a that shown generally at 10 in FIG. 1. The particular structure in FIG. 1 is the design shown in the aforementioned U.S. Pat. No. 4,281,473. Generally, such divider structures are designed to be used in an individual length thereof, or by a plurality of divider structures connected end-to-end for forming a boundary between adjacent landscaping areas and for preventing plant life, such as grass or the like, from rooting between adjacent landscaping areas. At this point, it should be understood that the use of the terms upper and lower, or top and bottom, in the description and claims herein, are intended to refer to the normal orientation of the divider structure as shown in FIG. 1, as the divider structure normally would be utilized for insertion in the ground. In addition, the use of the term "plane" of the structure is intended to be as viewed at one end of the structure, fully realizing that the structure is not completely flat. For instance, although the structure shown in FIG. 1 and described hereinafter, has a corrugated flange portion, most available bed divider structures have a flat planar flange section.

Still referring to FIG. 1, the divider structure 10 is elongated and includes an enlarged upper tubular portion 12 having opposite open ends 14. A flange portion, generally designated 16, extends lengthwise along the tubular upper portion 12 and depends downwardly therefrom for insertion in the ground, whereby the upper portion 12 is located above the top surface of the ground and the flange portion 16 forms a barrier between adjacent landscaping areas.

Means are provided intermediate the top and bottom of flange portion 16 to facilitate securing the flange portion in the ground More particularly, the securing means include a pair of upwardly canted lips 18 which diverge outwardly and upwardly in an "arrow" fashion from flange portion 16. By this upwardly canted and diverging configuration, the divider structure is more easily inserted into the ground, but provides considerable resistance to removal of the divider structure from the ground.

Means are provided on flange portion 16 for reinforcing the same in a vertical direction to facilitate inserting the divider structure in the ground and maintaining the same therein. More particularly, the reinforcing means is formed by corrugations defining vertical reinforcing ribs 20 on flange section 16. A plane portion 22 projects downwardly below securing lips 18 to provide a lead-in portion to facilitate locating and inserting the divider structure in the ground, while the corrugated ribs 20 above securing lips 18 provide reinforcing means on the flange section. Other details and advantages of this particular structural design can be derived from the aforesaid patent which is incorporated herein by reference.

From the foregoing, it should be understood that the vast majority of landscaping bed divider structures presently available have some form of enlarged upper portion, such as tubular portion 14, and some form of generally planar flange portion depending downwardly from the upper enlarged portion which forms a barrier between adjacent landscaping areas. Consequently, such structures are generally rigid in the "planes" of the structures should attempts to be made to bend the structures in the planes of their configurations, as indicated by double-headed arrow "A" in FIG. 1. However, the structures are fairly easily bent in directions transverse to their general planes, as indicated by double-headed arrow "B", so that the sections can be bent according to the desired contour of the landscaping area, as in a landscape circle at the base of a tree.

FIG. 2 shows an array of landscaping bed divider sections 10 arranged in an elongated stack of juxtaposed sections, the view showing one end of the stacked array. It can be seen that the sections alternate in the stack with the enlarged portion 14 of any section being juxtaposed with a distal end of the flange portion of an adjacent section. In the particular structural design of sections 10 shown in the drawings, the distal ends of the flange portions are defined by planar portions 22. This array of juxtaposed, stacked bed divider sections represents an arrangement for packaging the sections for transportation and display purposes heretofore known. To this end, some form of means, such as flexible plastic strapping 24, is used to hold all the bed divider sections in the arrangement shown.

The packaging system described in relation to FIG. 2 solves some of the problems, magnifies other problems and creates further problems over conventional spiral wound packaging systems, as fully described in the "Background" explanation, above. For instance, FIG. 3 shows a major problem in the packaging system of FIG. 2. It can be seen that an elongated package of bed divider sections arranged in an elongated stack of juxtaposed sections has a tendency to bend in the direction of arrow "B'" which corresponds to double-headed arrow "B" in FIG. 1 for the individual section shown therein. In other words, notwithstanding the fact that the sections are arranged in a stack of juxtaposed sections for shipping, handling and display purposes, the composite stack still is unsupported in a direction transverse to the general planar configuration of any given individual section. As also stated above, the present solution to such a problem is to package the entire elongated stack in a container, such as an elongated cardboard box construction. This solution, although rigidifying the stacked array of divider sections, adds considerably to the cost of the product. In fact, such packaging schemes render the product practically cost prohibitive for general consumer sales and restricts such elongated stacked packaging schemes to more expense-acceptable markets such as with professional landscaping businesses.

FIG. 4 shows an embodiment of the system of this invention for packaging a plurality of sections of landscaping bed dividers whereby the inherent nature of the divider sections themselves are used to their advantage to create a self-supporting arrangement whereby the sections are rigidified in all directions when so arranged. More particularly, as seen in FIG. 4, a plurality of bed divider sections 10a are arranged in an elongated stack of juxtaposed sections. Again, the sections are arranged in an alternating fashion with the enlarged portion 14 of any section being juxtaposed with a distal end or planar portion 22 of an adjacent section. This provides for a generally symmetrical stack.

The invention contemplates arranging another bed divider section, generally designated 10b, lengthwise along at least one side of the stack of sections 10a as shown, i.e., in such a manner that its flange portion is generally perpendicular to the flange portions of the plurality of bed divider sections 10a in the stack. In the preferred embodiment of the invention, a further bed divider section 10c is arranged along an opposite side of the stack of sections 10a, i.e., the side opposite section 10b, again in such a manner that its flange portion is generally perpendicular to the flange portions of the plurality of bed divider sections 10a in the stack. For symmetrical purposes, section 10c is arranged in a direction opposite that of section 10b, i.e., left-to-right as viewed in FIG. 4, for symmetry purposes.

Means, such as flexible strapping 24, are provided to hold all the bed divider sections 10a-10c in the arrangement shown in FIG. 4.

Lastly, it is preferred that the number of bed divider sections in any given package be such that the stack of sections 10a be of a height (looking left-to-right in FIG. 4) approximately equal to the width or top-to-bottom dimensions of any given bed divider, such as side bed dividers 10b, 10c in FIG. 4.

With the packaging system of the invention, as exemplified in FIG. 4, it can be understood that the package is rigidified in the direction of double-headed arrow "C" which corresponds to the direction of double-headed arrow "A" in FIG. 1. In other words, the stack is rigidified in the planes of the stacked sections just as any individual section is rigidified as described in relation to FIG. 1. Side sections 10b and 10c rigidify the package in the opposite direction as indicated by double-headed arrows "D", i.e., in the general planes of those sections, again as described in relation to an individual section in FIG. 1. In essence, side sections 10b and 10c prevent stacked sections 10a from bending transverse to their planar configurations as illustrated with prior packaging schemes exemplified in FIG. 3.

With the packaging arrangement of the invention, very minor holding means, such as inexpensive plastic strapping 24, is all that is needed to complete a very rigid package product. The strapping simply needs to be of sufficient strength to prevent the arrangement of sections from shifting. This can be accomplished by conventional, inexpensive packaging tape which has strengthening strands embedded therein and which, although simple and inexpensive, provides considerable strength in an elongation direction. Because of the lightweight nature of the product, one individual can carry a twenty-foot package of bed divider sections by grasping the package at the middle of its length.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for packaging a plurality of sections of elongate bed dividers each having a top and a bottom, a width defined between the top and bottom, and a flange that is approximately planar, each said flange having top and bottom ends and a lengthwise extent thereby defining at least a part of each bed divider section, said bed divider sections being embedded in the ground to form a boundary between adjacent landscaping areas, said system comprising:

a plurality of said bed divider sections arranged in an elongate stack of juxtaposed sections in which the planes of the flanges of the plurality of bed divider sections are in generally parallel relationship and overlapped with each other along the lengths of the bed divider sections to define a generally polygonal-sided stack viewed in cross section transverse to the length of the stack with a cross-sectional height taken at substantially a right angle to the planes of the flanges in the polygonal stack, the cross-sectional height of the stack being generally equal to the width of the bed divider sections;

another of said bed divider sections arranged lengthwise along at least one side of said polygonal stack in such a manner that the plane of its flange is generally perpendicular to the planes of the flanges of the plurality of bed divider sections in said polygonal stack; and means for holding the plurality of bed divider sections in the polygonal stack and the another bed divider section in a discrete package whereby the stack of sections rigidify the package in one transverse direction and said another section rigidifies the package in an opposite, transverse direction.

2. The system of claim 1, including a further of said bed divider sections arranged along an opposite side of said polygonal stack in such a manner that its flange is generally perpendicular to the flanges of the plurality of bed divider sections in said polygonal stack.

3. A method of packaging a plurality of sections of elongate bed dividers which are embedded in the ground to form a boundary between adjacent landscaping areas, said method comprising the steps of:

providing a plurality of bed divider sections, each said bed divider section having a flange that is approximately planar, said flange having top and bottom ends and a lengthwise extent thereby defining at least a part of each bed divider section;

arranging a plurality of said bed divider sections in an elongate stack in which the planes of the flanges of the plurality of bed divider sections are in generally parallel relationship and overlapped with each along the lengths of the bed divider sections to define a generally polygonal-sided stack viewed in cross section transverse to the length of the stack;

arranging another of said bed divider sections lengthwise along at least one side of said polygonal stack in such a manner that the plane of its flange is generally perpendicular to the planes of the plurality of flange portions of the plurality of bed divider sections in said polygonal stack; and retaining the plurality of bed divider sections in the polygonal stack and the another bed divider section in a discrete package, there being no additional bed divider sections arranged in said discrete package at said one side of the polygonal stack so that the flange thereof is parallel to the flange of the another bed divider sections in overlapping relationship with the flange on the another flange section taken perpendicular to the plane of the flange of the another bed divider section.

4. The method of claim 3, including the step of arranging a further of said bed divider sections along an opposite side of said polygonal stack in such a manner that its flange portion is generally perpendicular to the planes of the flange portions of the plurality of bed divider sections in said polygonal stack.

5. The method of claim 3, wherein each said bed divider section has an enlarged portion at the top end on the flange and including the step of arranging said plurality of bed divider sections in said polygonal stack in an alternating fashion with the enlarged portion of any section being juxtaposed with a bottom end of a flange portion of an adjacent section.

6. The method of claim 3 wherein the number of said plurality of bed divider sections in said polygonal stack thereof is selected such that a height of the polygonal stack, taken transverse to the planes of the sections in the polygonal stack, is approximately equal to a width of a bed divider section from the top of its enlarged portion to the bottom of tis flange portion.

7. The system of claim 5 wherein each bed divider section has a lip extending laterally outwardly from said flange portion, and each said plurality of bed divider sections in said polygonal stack has its lip engaging the enlarged portion of an adjacent section.

8. The system of claim 7, including a pair of said lips on each bed divider section, one lip extending outwardly from each side of the flange portion.

9. The system of claim 5 wherein said enlarged top portion of each bed divider section is tubular.

* * * * *